US008960625B2

(12) United States Patent
Ma (10) Patent No.: US 8,960,625 B2
(45) Date of Patent: Feb. 24, 2015

(54) MOVABLE BASE WITH CONTROL SURFACE (71) Applicant: Oliver Joen-an Ma, Arcadia, CA (US)

(72) Inventor: Oliver Joen-an Ma, Arcadia, CA (US)

(*) Notice: Subject to any disclaimer, the term of this patent is extended or adjusted under 35 U.S.C. 154(b) by 0 days.

(21) Appl. No.: 14/155,092

(22) Filed: Jan. 14, 2014

(65) Prior Publication Data

US 2014/0190294 A1 Jul. 10, 2014

Related U.S. Application Data (62) Division of application No. 13/174,523, filed on Jun. 30, 2011, now Pat. No. 8,657,246.

(60) Provisional application No. 61/361,320, filed on Jul. 2, 2010.

(51) Int. Cl.
B65D 19/00 (2006.01)
F16H 21/54 (2006.01)
E04H 12/22 (2006.01)

(52) U.S. Cl.
CPC ............ F16H 21/54 (2013.01); E04H 12/2238 (2013.01)
USPC ................. 248/346.01; 248/129; 248/346.11; 248/519; 280/35; 280/79.11

(58) Field of Classification Search
CPC ...... F16H 21/54; F16M 13/00; B62B 5/0083; B62B 2205/14; E04H 12/2238
USPC ............... 248/550, 346.01, 128, 129, 346.02, 248/346.03, 346.11, 519; 280/35, 79.11, 280/79.3, 641; 16/18 R, 19, 45, 29, 32, 33, 16/31 R, 43; 135/16
See application file for complete search history.

(56) References Cited

U.S. PATENT DOCUMENTS

| 1,063,620 | A | 6/1913 | Thornley |
| 1,261,142 | A | 4/1918 | McNichol |
| 1,427,296 | A | 8/1922 | Jakubiec |
| 1,940,523 | A | 12/1933 | Barclay |
| 2,266,398 | A | 12/1941 | Quayle |
| 2,379,476 | A | 7/1945 | Cleveland, Jr. |
| 2,383,390 | A | 8/1945 | Jacobs |
| 2,784,433 | A | 3/1957 | Verhagen |

(Continued)

FOREIGN PATENT DOCUMENTS

| DE | 20015358 | 2/2001 |
| DE | 10311537 | 9/2004 |

(Continued)

OTHER PUBLICATIONS

Extended European Search Report, Application No. 11250635.7, mailed on May 8, 2013.

Primary Examiner — Anita M King
(74) Attorney, Agent, or Firm — Knobbe Martens Olson & Bear LLP (57) ABSTRACT In a further embodiment, a method of controlling a base assembly can be provided. An actuation member can be pumped to deploy one or more wheels to lift a base assembly on said wheels. Further, a pin can be received in a holding portion on a semi-planar contoured surface in response to the pumping of the actuation member. The wheels can be held in a deployed position via the pin being held in the holding portion. Further pumping of the actuation member can separate the pin from the holding portion and retract the wheels from the deployed position.

22 Claims, 7 Drawing Sheets

(56) References Cited

U.S. PATENT DOCUMENTS

| | | | |
|---|---|---|---|
| 2,952,471 | A | 9/1960 | Thorpe |
| 3,025,058 | A | 3/1962 | Brumfield |
| 3,179,438 | A | 4/1965 | Field |
| 3,259,432 | A | 7/1966 | Jackson |
| 3,353,837 | A | 11/1967 | Marcyan |
| 3,606,445 | A | 9/1971 | Wunderlich |
| 3,633,242 | A | 1/1972 | Wasofsky |
| 3,635,491 | A | 1/1972 | Drews et al. |
| 3,686,782 | A | 8/1972 | Erickson et al. |
| 3,841,631 | A | 10/1974 | Dolan |
| 4,000,750 | A | 1/1977 | Becher |
| 4,063,616 | A | 12/1977 | Gutierrez |
| 4,177,978 | A | 12/1979 | Warsaw |
| 4,232,477 | A | 11/1980 | Lin |
| 4,249,282 | A | 2/1981 | Little |
| 4,270,399 | A | 6/1981 | Knief |
| 4,365,819 | A | 12/1982 | Bart |
| 4,412,679 | A | 11/1983 | Mahoney et al. |
| 4,417,738 | A | 11/1983 | Kendall |
| 4,591,126 | A | 5/1986 | Berney |
| 4,804,162 | A | 2/1989 | Rice |
| 4,837,955 | A | 6/1989 | Grabhorn |
| 4,874,182 | A | 10/1989 | Clark |
| 4,902,026 | A | 2/1990 | Maldonado |
| 5,024,012 | A | 6/1991 | Lovik |
| 5,041,047 | A | 8/1991 | Casale |
| 5,102,364 | A | 4/1992 | Kubiatowicz |
| 5,108,339 | A | 4/1992 | Kieves |
| 5,207,407 | A | 5/1993 | Fitzsimmons et al. |
| 5,220,740 | A | 6/1993 | Brault |
| 5,248,140 | A | 9/1993 | Matherne et al. |
| 5,254,026 | A | 10/1993 | Kaiser |
| 5,259,612 | A | 11/1993 | Matherne et al. |
| 5,283,595 | A | 2/1994 | Krukovsky |
| 5,322,023 | A | 6/1994 | Hammond |
| 5,330,213 | A | 7/1994 | Peruso |
| 5,338,243 | A | 8/1994 | Kieves |
| 5,348,326 | A | 9/1994 | Fullenkamp et al. |
| 5,354,049 | A | 10/1994 | Matherne et al. |
| 5,354,793 | A | 10/1994 | Hudson |
| 5,375,835 | A | 12/1994 | Van Nimwegen et al. |
| 5,480,191 | A | 1/1996 | Litin et al. |
| 5,599,037 | A | 2/1997 | Spickler |
| 5,615,451 | A | 4/1997 | Peterson et al. |
| 5,628,522 | A | 5/1997 | Hall |
| 5,628,523 | A | 5/1997 | Smith |
| 5,636,649 | A | 6/1997 | Horvath |
| 5,730,668 | A | 3/1998 | Hege et al. |
| 5,743,283 | A | 4/1998 | Horvath |
| 5,839,714 | A | 11/1998 | Fitzsimmons et al. |
| 5,940,932 | A | 8/1999 | LaHay |
| 5,957,145 | A | 9/1999 | Plumer |
| 5,979,793 | A | 11/1999 | Louis |
| 6,113,054 | A | 9/2000 | Ma |
| 6,305,659 | B1 | 10/2001 | Metelski |
| 6,336,450 | B1 | 1/2002 | Collet |
| 6,367,494 | B1 | 4/2002 | Tung et al. |
| 6,374,839 | B2 | 4/2002 | Patarra |
| 6,405,990 | B2 | 6/2002 | Davis et al. |
| 6,412,746 | B2 | 7/2002 | Davis et al. |
| 6,412,747 | B2 | 7/2002 | Davis et al. |
| 6,446,930 | B1 | 9/2002 | Li |
| 6,478,799 | B1 | 11/2002 | Williamson |
| 6,511,033 | B2 | 1/2003 | Li |
| D470,305 | S | 2/2003 | Clarke |
| 6,523,640 | B1 | 2/2003 | Young et al. |
| 6,554,012 | B2 | 4/2003 | Patarra |
| 6,554,243 | B2 | 4/2003 | Davis et al. |
| 6,594,951 | B1 | 7/2003 | Reynolds |
| 6,637,717 | B2 | 10/2003 | Li |
| D484,303 | S | 12/2003 | Taylor |
| 6,656,065 | B2 | 12/2003 | Nye |
| D485,055 | S | 1/2004 | Taylor |
| 6,682,055 | B1 | 1/2004 | Tomlinson et al. |
| 6,732,752 | B2 | 5/2004 | Cohen et al. |
| 6,758,715 | B2 | 7/2004 | Banks |
| 6,796,319 | B1 | 9/2004 | Patarra et al. |
| 6,827,321 | B1 | 12/2004 | Murren et al. |
| 6,869,058 | B2 | 3/2005 | Tung |
| 6,889,953 | B2 | 5/2005 | Harbaugh |
| D516,297 | S | 3/2006 | Smith et al. |
| 7,140,581 | B1 | 11/2006 | White |
| 7,143,061 | B2 | 11/2006 | Treynor |
| 7,163,212 | B1 | 1/2007 | Rupp |
| 7,207,570 | B1 | 4/2007 | Forbes |
| 7,347,428 | B2 | 3/2008 | Edenso |
| D568,603 | S | 5/2008 | Smith et al. |
| D573,786 | S | 7/2008 | Smith et al. |
| D578,749 | S | 10/2008 | Ng |
| 7,503,541 | B2 | 3/2009 | Harold et al. |
| 7,513,479 | B2 | 4/2009 | Li |
| 7,537,015 | B1 | 5/2009 | Molnar, IV et al. |
| 7,584,563 | B2 | 9/2009 | Hillstrom et al. |
| 7,614,600 | B1 | 11/2009 | Smith et al. |
| 7,641,165 | B2 | 1/2010 | Li |
| 7,836,902 | B2 | 11/2010 | Tung |
| 7,891,633 | B2 | 2/2011 | Li |
| 2001/0013358 | A1 | 8/2001 | Patarra |
| 2001/0035485 | A1 | 11/2001 | Davis et al. |
| 2001/0045498 | A1 | 11/2001 | Davis et al. |
| 2002/0053631 | A1 | 5/2002 | Li |
| 2002/0185582 | A1 | 12/2002 | Li |
| 2003/0145498 | A1 | 8/2003 | Venegas, Jr. |
| 2003/0230692 | A1 | 12/2003 | Davis et al. |
| 2004/0056169 | A1 | 3/2004 | Harbaugh |
| 2004/0069922 | A1 | 4/2004 | Wu |
| 2004/0108439 | A1 | 6/2004 | Ma |
| 2004/0195487 | A1 | 10/2004 | Harbaugh |
| 2005/0161067 | A1 | 7/2005 | Hollins |
| 2005/0189005 | A1 | 9/2005 | Smith et al. |
| 2006/0054206 | A1 | 3/2006 | Bilotti |
| 2006/0272686 | A1 | 12/2006 | Tung |
| 2007/0080277 | A1 | 4/2007 | Chen |
| 2007/0082578 | A1 | 4/2007 | Haynes |
| 2008/0111046 | A1 | 5/2008 | Tung |
| 2009/0056775 | A1 | 3/2009 | Kuelbs |
| 2009/0174162 | A1 | 7/2009 | Gass et al. |
| 2009/0320341 | A1 | 12/2009 | Hillstrom et al. |
| 2010/0065709 | A1 | 3/2010 | Ying |
| 2010/0147341 | A1 | 6/2010 | Li |
| 2011/0232704 | A1 | 9/2011 | Li |
| 2012/0024329 | A1 | 2/2012 | Ma |
| 2012/0025050 | A1 | 2/2012 | Ma |
| 2012/0285497 | A1 | 11/2012 | Li |
| 2012/0285499 | A1 | 11/2012 | Li |

FOREIGN PATENT DOCUMENTS

| | | |
|---|---|---|
| EP | 1243722 | 9/2002 |
| EP | 2389912 | 11/2011 |

MOVABLE BASE WITH CONTROL SURFACE

CROSS-REFERENCE TO RELATED APPLICATIONS

This application is a divisional application of U.S. patent application Ser. No. 13/174,523, filed 30 Jun. 2011, and titled "MOVABLE BASE WITH CONTROL SURFACE", which claims the priority benefit under 35 U.S.C. §119(e) to U.S. Provisional Patent Application Ser. No. 61/361,320 (filed 2 Jul. 2010), the entirety of which is hereby expressly incorporated by reference herein.

BACKGROUND OF THE INVENTIONS

1. Field of the Inventions

The inventions generally relate to load-supporting bases, and more particularly load-supporting bases with retractable wheels.

2. Description of the Related Art

In some cases heavy objects such as ladders and platforms are desired to be portable to enable their use in a variety of locations. For example, it is a common practice at retail stores to keep inventory in high shelves above the merchandise accessible to customers. The inventory is accessed using a portable ladder device that has wheels enabling the ladder to move about the store. A break device is sometimes provided with these ladders to immobilize the ladder when being used to access the inventory.

Other heavy objects are enabled to move or be immobilized by specialized mechanisms. For example, U.S. Pat. App. Pub. No. 2005/0189005 discloses a wheel lifted from the ground by a foot that is raised and lowered by turning a small screw in clockwise and counter-clockwise directions. Although this allows the apparatus to move on and off of the wheels, the mechanism provided may be inconvenient as the rotation of the screw may be difficult when the apparatus bears a heavy load.

SUMMARY OF THE INVENTIONS

One aspect of the inventions is to provide a movable base that is easy to move between configurations where the wheels are either deployed or retracted. For example, in one embodiment a base assembly can include a load-bearing base. The load-bearing base can have one or more downward-facing recesses. Additionally, one or more wheels can be rotatably mounted within the load-bearing base. The wheels can be movable between a first wheel position within the one or more downward-facing recesses and a second wheel position extending out of the one or more downward-facing recesses. An actuating member can also be movably coupled to the base. Then, a transmission rod can be coupled to the actuating member such that actuation of the actuating member causes the transmission rod to translate relative to the load-bearing base. Further, a pin can be mounted to the transmission rod. A pin path can be substantially defined by a contoured surface on a control plate rotatably mounted to the load-bearing base. The pin can move from a first stable position and enter into a second stable position along the path upon a first actuation of the actuating member. The pin can exit the second stable position and return to the first stable position along the path upon a second actuation of the actuating member. The motion of the transmission rod can cause the pin to move between the first and second plate positions and the wheels to simultaneously move between the first and second wheel positions.

Another embodiment of the invention can include a base assembly having a load-bearing base. An actuating lever can be movably coupled to the base. A transmission member can operatively couple to the actuating lever. A pumping of the actuating lever can cause the transmission member to move relative to the load-bearing base. A pin can be mounted to one of the transmission member and the load-bearing base. The pin can then move in at least one direction relative to the transmission member or load-bearing base. Further, a control element can be mounted to the other of the transmission member and load-bearing base. The control element can then also move in at least one direction relative to the transmission member or load-bearing base. The control element can have a surface defining at least one stable holding position for the pin. The pin can be received in the stable holding position upon a first pump of the actuating lever and can be separated from the stable holding position upon a second pump of the actuating lever. A plurality of wheels can be rotatably mounted to the load-bearing base. The wheels can be movable between a first wheel position not supporting the base and a second position where the wheels can support the base. Movement of the wheels between these positions can correspond with the movement of the pin relative to the control element.

In an additional embodiment, a control mechanism can include a pin disposed on a housing. A control element can also be disposed on the housing. The control element can be disposed on the housing such that the control plate can at least move relative to the pin. The control element can also define a surface comprising an angled portion, a holding portion, and an offset portion. A first motion of the control element relative to the pin can cause the pin to traverse the angled portion. A second motion of the control element relative to the pin generally opposite the first motion can cause the holding portion to receive the pin. A third motion of the control element relative to the pin generally in the same direction as the first motion can cause the pin to be separated from the holding portion and to traverse the offset portion. A fourth motion of the control element relative to the pin generally in the same direction as the second motion can cause the pin to be separated from the offset portion.

In a further embodiment, a method of controlling a base assembly can be provided. An actuation member can be pumped to deploy one or more wheels to lift a base assembly on said wheels. Further, a pin can be received in a holding portion on a semi-planar contoured surface in response to the pumping of the actuation member. The wheels can be held in a deployed position via the pin being held in the holding portion. Further pumping of the actuation member can separate the pin from the holding portion and retract the wheels from the deployed position.

BRIEF DESCRIPTION OF THE DRAWINGS

Some preferred embodiments of the inventions will now be more particularly described by reference to the accompanying drawings in which.

DETAILED DESCRIPTION OF THE PREFERRED EMBODIMENTS

Figure 1A:
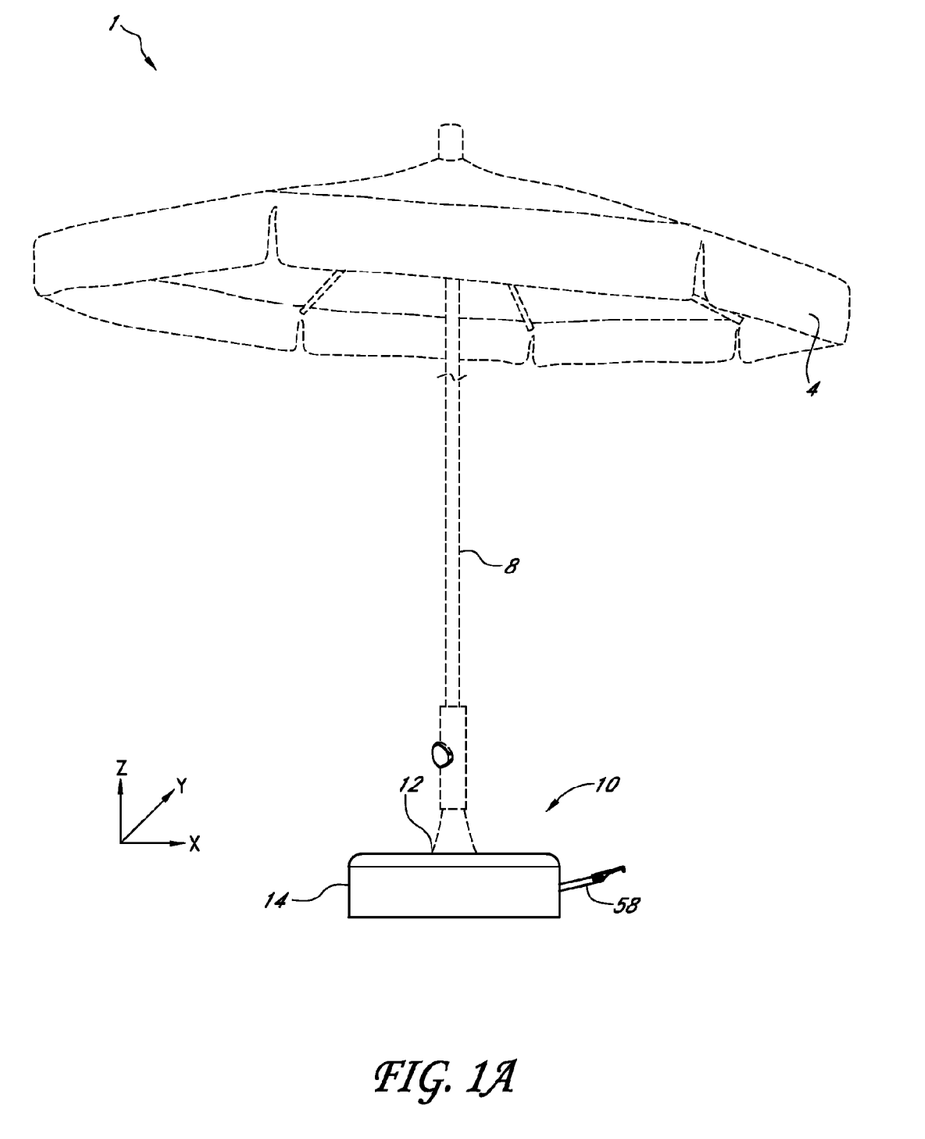
FIG. 1A is a side view of one embodiment of a movable base supporting an umbrella.
Figure 2A:
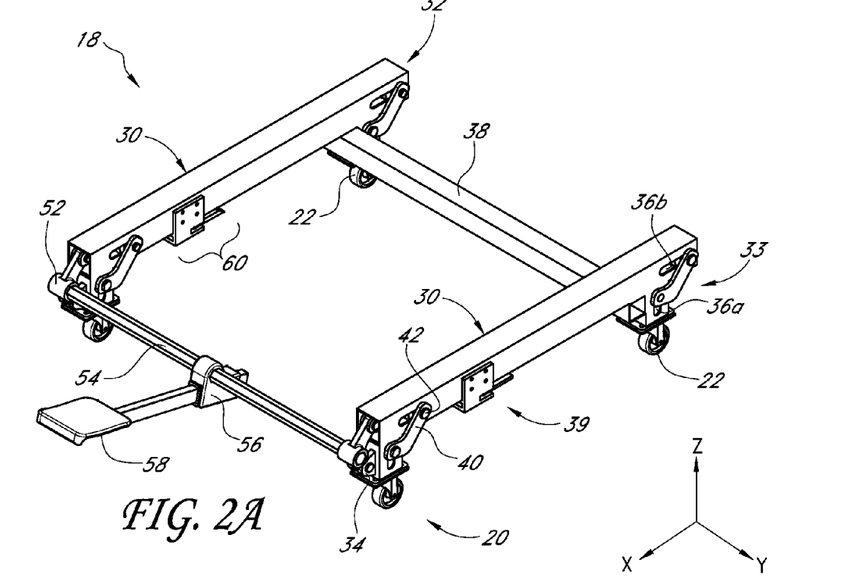
FIG. 2A is a perspective view of the base of FIG. 1A with the cover removed.

FIGS. 1A and 2A depict an x-y-z Cartesian coordinate system, with the base assembly 10 primarily lying in the x-y plane. To assist in the description of these components, the following terms are used. As described herein, terms such as "height" refer to distance in the z-direction, and "higher/upward" and "lower/downward" refer to the positive and negative z-direction, respectively. Similarly, terms such as "lateral" will refer to the y-direction and "longitudinal" will refer to the x-direction. However, in other embodiments these axes could be rotated, reversed, or otherwise altered. A detailed description of preferred embodiments of movable base assemblies and their associated methods of use now follows.

FIG. 1A illustrates one embodiment, in which an umbrella system 1 can include an umbrella mounted on a movable base assembly 10. As depicted, the umbrella includes an umbrella canopy 4 and a single umbrella pole 8. However, in other embodiments the umbrella system 1 can have different forms, such as including a cantilevered umbrella. Further, in other embodiments another item to be supported by the base assembly 10 can be substituted for the umbrella, such as a space heater, street lamp, general purpose cart, semi-mobile furniture such as a desk or chair, or the like. The umbrella pole 8, or other items, can mount to a mounting portion 12 on the base assembly 10.

Figure 1B:
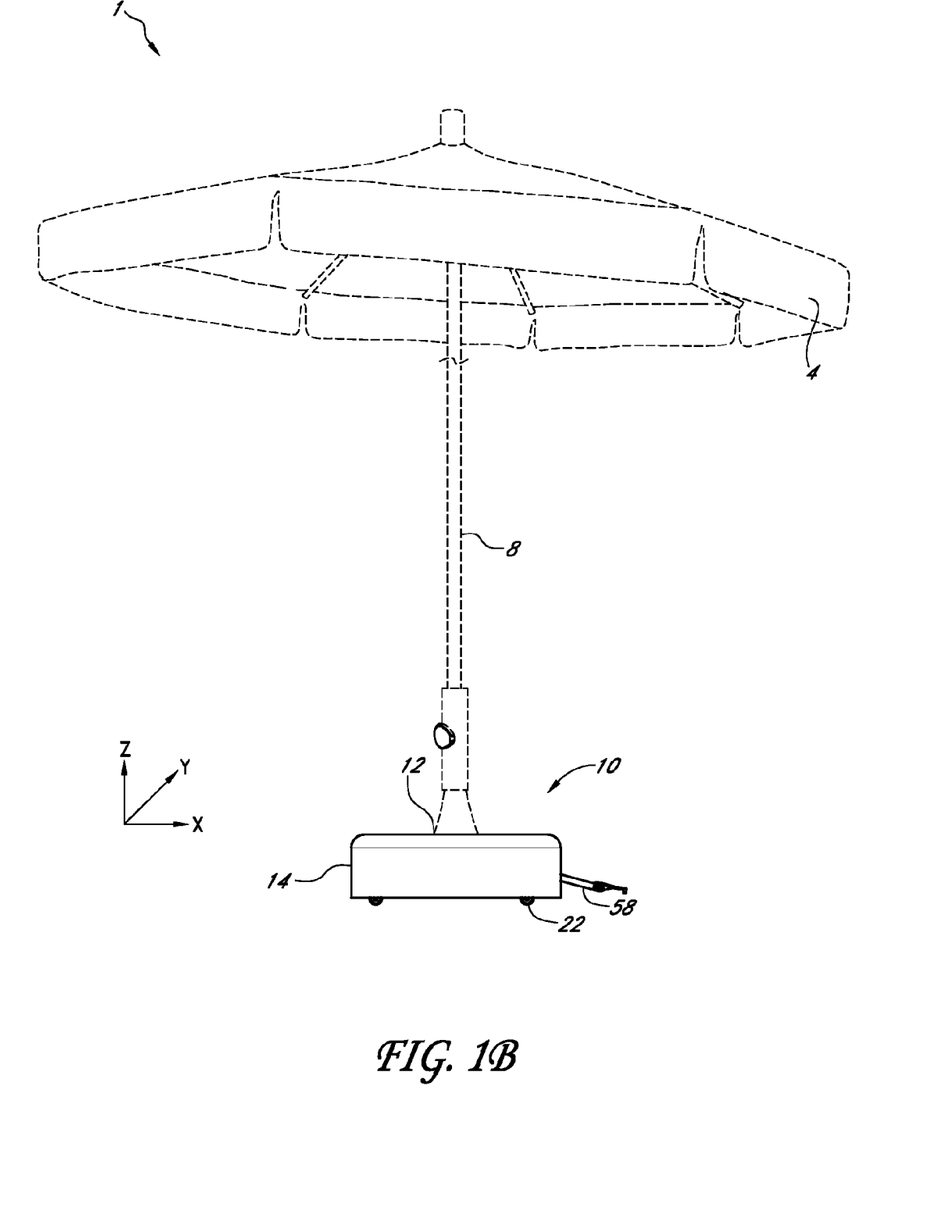
FIG. 1B is a side view of the movable base of FIG. 1A wherein wheels are deployed.

As further depicted in FIG. 1B, the base assembly 10 comprises a plurality of wheels 22. Thus, the base assembly 10, and the umbrella (or another load) can be easily rolled to different locations on the wheels 22, when deployed. Comparing FIGS. 1A and 1B shows that the wheels 22 can also be retracted.

FIGS. 1A and 1B also depict an actuating member 58, depicted as a lever or foot pedal. As will be discussed further below, the wheels 22 of the umbrella system 1 can be retracted upon actuation of the foot pedal 58. The wheels 22 can be retracted into a cover 14, and the cover can then substantially bear the weight of the umbrella or other load. When the wheels 22 are retracted, the bottom surface of the cover 14 can produce sufficient friction with the ground to substantially hinder sliding or other lateral movement of the umbrella system 1. Thus, in some embodiments the umbrella assembly 1 can stay in a desired position when the wheels are retracted.

It will be noted that, in the depicted embodiment, the wheels 22 can continue to contact the ground on which the base assembly 10 (and the cover 14) rest even when the wheels 22 are in a retracted position, as will be explained further below. Nevertheless, the wheels 22 can bare a relatively small portion of the weight of the umbrella system 1 in comparison to the cover 14. Thus, ever though the wheels 22 can contact the ground, the cover 14 can still substantially prevent sliding or rolling of the umbrella system 1. However, in other embodiments the wheels 22 can be configured to not touch the ground when in a retracted position.

Figure 2B:
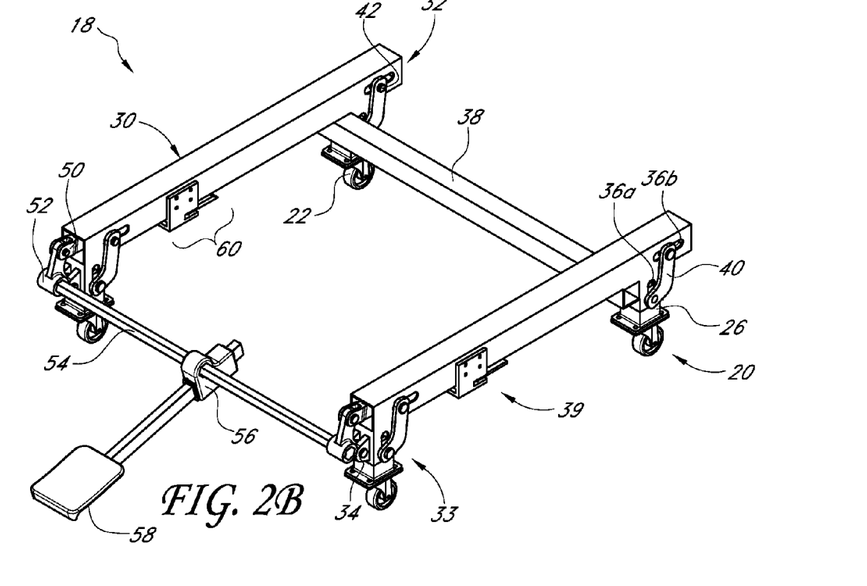
FIG. 2B is a perspective view of the base with wheels deployed, as in FIG. 1B with the cover removed.

FIGS. 2A and 2B depict the base assembly 10 without the cover 14. The cover 14, when present as in FIG. 1B, can rest on the remainder of the base assembly 10, such as on the frame 18 depicted in FIGS. 2A and 2B. Thus, the deployed wheels 22 can support the frame 18, the frame 18 can support the cover 14, and the cover 14 can support a load, such as an umbrella. When the cover 14 is present, as depicted in FIG. 1A, the wheels 22 can be withdrawn or retracted into one or more downward facing recess defined by the cover. The cover 14 can then, as discussed above, be in direct contact with and be supported by the ground. The wheels 22 can thus be suspended above the ground by the cover 14, or alternatively bear a relatively small portion of the weight of the umbrella system 1.

The cover 14 is depicted as completely covering the frame 18 and other parts of the base assembly 10, but the cover can also take other forms. For example, in some embodiments the cover 14 can be a secondary frame with a generally skeletal form. In other embodiments, the cover 14 can substantially cover the base but leave certain windows open. Thus, downward facing recesses on the cover 14 that receive the retracted wheels 22 need not be fully enclosed in all embodiments. Further, in some of these embodiments the cover 14 can have a multi-part form, including structural portion and an aesthetic portion to conceal the structural portion such as a shroud. In other embodiments, the cover 14 can be integrated into the frame 18.

Figure 3A:
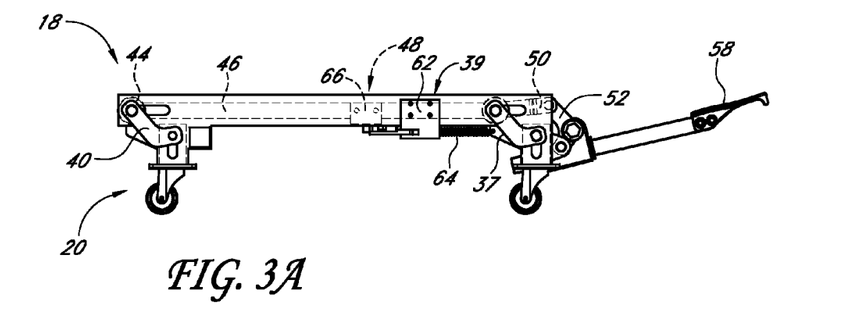
FIG. 3A is a side view of the base in the configuration depicted in FIG. 2A, with the interior of the frame shown in phantom.
Figure 3B:
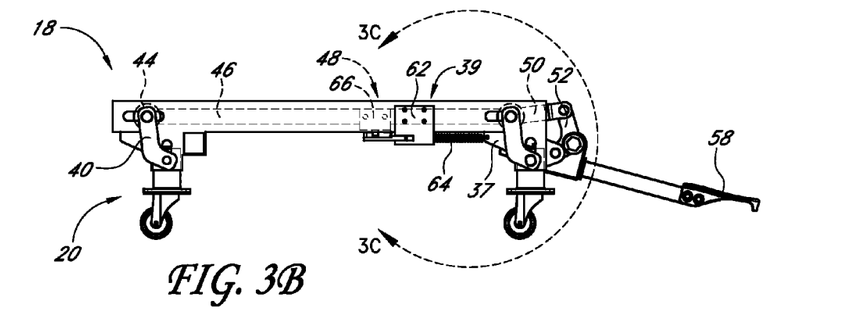
FIG. 3B is a side view of the base in the configuration depicted in FIG. 2B, with the interior of the frame shown in phantom.
Figure 3C:
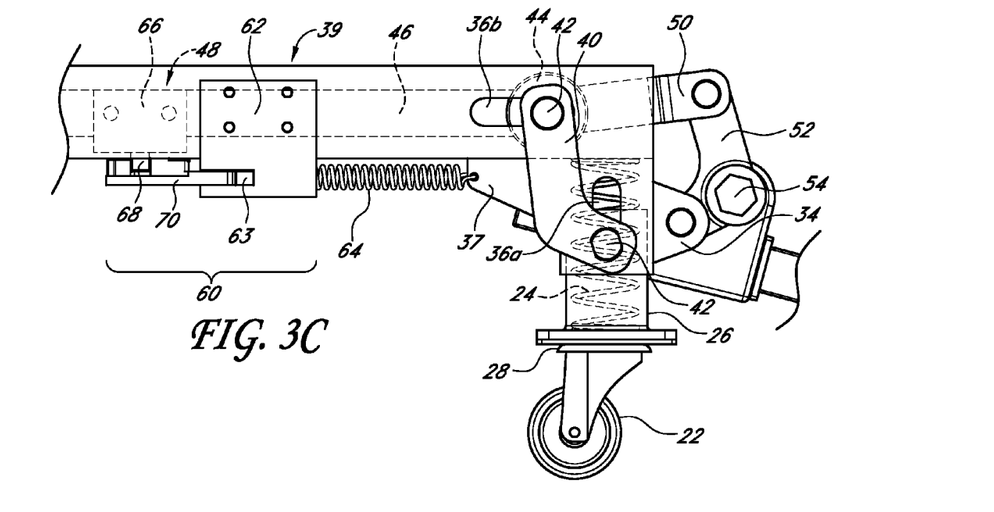
FIG. 3C is an enlarged side view of the base of FIG. 3B at 3C-3C.

As depicted in FIGS. 2A-3C and discussed above, the base assembly 10 includes a frame 18. The frame 18 can include one or more wheel assemblies 20 and is depicted as having four. As depicted, the wheel assemblies are arranged in a rectangular orientation (although other orientations and numbers of wheels are possible). Further, the frame 18 has two side housings 30 connected both by a cross-beam 38 and an actuating shaft 54, and the wheel assemblies 20 mount at generally opposite ends of the side housings 30 in hollow wheel receiving portions 33. Each wheel assembly 20 can include a wheel 22 mounted to a wheel mount 26. The wheel mount 26 is best depicted in FIGS. 2B and 3C, extending out of the hollow wheel receiving portion 33 extending downward from the side housing 30.

In some embodiments the wheel mount 26 can include an internal spring or shock 24 (depicted in FIG. 3C) that can reduce stresses on the frame 18, the base assembly 10, and the umbrella system 1, due to shocks such as bumps in a surface the wheels 22 roll over. Additionally, a biasing element such as a spring 24 can help push the wheels 22 into the deployed position. As shown, the spring 24 can be positioned generally between the wheel assembly 20 and the side housing 30. Thus, the spring 24 can push the wheel assembly 20 away from the side housing 30, and toward the deployed position.

The force with which the spring 24 biases the wheels 22 into the deployed position can be configured to be generally less than the force necessary to deploy the wheels. In some embodiments, the deployment of the wheels 22 coincides with a lifting of the umbrella assembly 1 off the cover 14. Thus, even with the spring 24, the wheels 22 can still remain in a retracted position and the cover 14 can substantially support the load, despite the countervailing bias from the spring. This countervailing bias provided by the spring can also reduce the force on the actuating member 58 necessary to deploy the wheels 22, as it can press the wheels 22 toward such a position.

As further depicted, the wheel assembly 20 can mount to one or more pins 42 within a vertical slot 36a in the wheel receiving portion 33, and to a wheel connector 40 with a matching connector on the opposite side via the pin. As best depicted in FIG. 3C, the pin 42 in the vertical slot 36a could potentially interfere with the spring 24. Accordingly, in some embodiments the pin 42 in the vertical slot 36a can be a pair of shortened fasteners that do not protrude through the entirety of the wheel receiving portion 33 and the two wheel connectors 40 on either side thereof. For example, there can be two pins 42 (one on each side of the wheel receiving portion) that each pass through a wheel connector 40, one side of the vertical slot 36a, and an adjacent side of the wheel mount 26. In some embodiments the pin 42 can thread into the wheel mount 26, thus securing the wheel mount to the wheel connector 40 by a screw-connection.

The connectors 40 can also mount within a horizontal slot 36b via one or more pins 42. Additionally, this pin 42 can extend through a side of the wheel connectors 40 opposite the other pin 42. The pin 42 can potentially be held by a screw and bolt connection (although other arrangements are contemplated). Each of the pins 42 can allow relative rotation and translation between the wheel connectors 40 and the vertical and horizontal slots 36a, 36b, as the pins 42 translate through the slots. Thus, the wheel assembly 20 can translate vertically, through the wheel receiving portion 33, as the associated pin 42 translates through the vertical slot 36a. This can occur in response to a horizontal motion of the pin 42 in the horizontal slot 36b, via the connector 40 spanning the pins. Accordingly, the wheel assembly 20 can be moved between at least two positions: one of which being deployed and extending farther out of the wheel receiving portion 33 to support the umbrella system 1; and the other being more retracted into the wheel receiving portion and allowing the cover 14 to support the umbrella system.

As described above, all four wheel assemblies 20 in the depicted embodiment have motion controlled by a mechanism. However, other embodiments are contemplated, in combination with the other features described herein. For example, as depicted, the two wheels closer to the foot pedal 58 can have an additional set of bearings 28 allowing these wheels to swivel independently, improving the steerability of the umbrella system 1. In other embodiments, the slots 36a,b can be oriented in other directions and the wheel connectors 40 can have different shapes or forms. Further, in some embodiments the wheel assemblies 20 can move via other mechanisms such as a gear-assembly that translates horizontal motion into vertical motion (such as a worm gear interacting with a standard gear) or a slider pressing against a slanted surface.

The pin 42 mounted in the horizontal slot 36b can also mount to a roller 44. The roller 44 can be positioned within an extended hollow shaft 32 of the side housing 30. In some embodiments, the roller 44 can include two wheels surrounding a transmission member in the form of a transmission member 46 that is also mounted on the pin 42, as best depicted in FIGS. 3A-3C. In the illustrated embodiments, the transmission member 46 is a rod. As will be described further below, the transmission member 46 can transmit an actuating force from an actuating member such as the lever 58 to the wheel assemblies 20 that are on the opposite side of the base assembly 10. Thus, the wheels 22 on both ends of the base assembly 10 can be moved between deployed and retracted positions.

Additionally, the transmission member 46 can include a control mounting section 48 in an intermediate section of the transmission member. As will be further discussed below, this control mounting section 48 of the transmission member 46 can be generally adjacent a corresponding control mounting section 39 of the side housing 30, and the control mounting sections can receive associated components that can control the movement of the wheel assemblies 20.

As depicted, the opposite ends of the transmission member 46 can mount to the pins 42. The pins 42 can associate with wheel connectors 40, and in turn with wheel assemblies 20, on each side of the transmission member 46. The transmission member 46 can mount to or form a part of a linkage. In the depicted embodiment the linkage can include a first connector 50 at the end of the transmission member 46 closer to the actuating member 58. The transmission member 46 mounts to the first connector via a pin 42 in this embodiment. The pin 42 also connects to a wheel connector 40, as discussed above. The first connector 50 can thus be pivotally mounted to the transmission member 46, and can in turn be pivotally mounted to a second connector 52. The second connector 52 can then be pivotally mounted to the side housing 30 at a rotational mounting portion 34 depicted as being at an end of the side housing 30. Thus, rotation of the second connector 52 relative to the side housing 30 can result in a translation of the transmission member 46 relative to the side housing.

Further, an intermediate portion of the second connector 52 can receive an actuating shaft 54. As depicted, the actuating shaft 54 can have a hexagonal shape that resists rotation relative to a hexagonal hole in the second connector 52 that receives the shaft. Other shapes, combinations of shapes (e.g., tight-fitting, non-circular shapes), and mechanisms (e.g. locking pin or clamp) are also possible for the shaft and corresponding hole. By these combinations of connections, a rotation of the actuating shaft 54 can cause a rotation of the second connector 52 about the side housing 30, which can cause a translation of the transmission member 46 as described above. Translation of the transmission member 46 can cause the wheel assemblies 20 farther from the actuating member 58 to move between deployed and retracted positions. Notably, the wheel assemblies 20 disposed closer to the actuating member 58 can have a more direct connection to the actuating member 58 (e.g., through the first and second connectors 50, 52). Thus, these closer wheel assemblies 20 can move between deployed and retracted positions in the depicted embodiment, without the assistance of the transmission member 46.

Thus, the rotation of the actuating shaft 54 can cause the motion of all wheel assemblies 20 between deployed and retracted positions in certain embodiments. However, in other embodiments different mechanisms can be used. For example, in some embodiments it may be desirable to only deploy/retract certain wheels, such as the wheels closer to or farther from the actuating member 58. In other embodiments, the same wheels can be moved by other mechanisms, such as a cam shaft on the actuating shaft 54 pushing or pulling a transmission member 46. Even further, in some embodiments the motion can be actuated by a mechanism other than a rotating shaft.

In the depicted embodiment, the rotation of the actuating shaft 54 can be initiated via a rotation piece 56 also rotationally fixed with the actuating shaft with a hexagonal hole. The rotation piece 56 can include a slot that receives an actuating member 58 depicted as a lever with a foot pedal. Thus, when a user applies a downward pressure to the foot pedal, the actuating member 58 can rotate and cause a corresponding rotation of the rotation piece 56 and the actuating shaft 54. This application of pressure to the actuating member 58 can thus cause a movement of the wheel assemblies 20 between deployed and retracted positions. In other embodiments, this actuation can be supplied by other mechanisms such as a rotatable hand crank, translating foot pedal, or the like. In some embodiments, a foot pedal may be preferable as the foot can generally provide a stronger force, especially when pressing downward.

In further embodiments, it may be desirable to provide additional controls on the motion of the wheel assemblies 20. For example, when the wheels 22 are deployed and they hold the weight of the umbrella assembly 1, the weight could be sufficient to push the wheel assemblies 20 back into a retracted position. In some embodiments friction may be sufficient to prevent this movement absent additional forces (such as pressure on the actuation member 58). Such friction can arise in the depicted embodiment between the wheel assemblies 20 and the wheel receiving portions 33, between the rollers 44 and the extended hollow shaft 32, and between the pins 42 and their various corresponding surfaces. However, in other embodiments such friction might not be sufficient. Further, greater control over the motion of the wheel assemblies 20 may be desired for other reasons, such as to put the base assembly 10 into a safety lock to more robustly prevent motion.

Thus, a control assembly 60 can also be provided, as depicted in detail in FIGS. 3C-6. As discussed above, the side housing 30 and the transmission member 46 can both include control mounting sections 39, 48, to which control features can be mounted. The side housing's control mounting section 39 can include an extended slot on a lower portion of the side housing, and a plurality of mounting holes to receive a plate mount 62. The transmission member's control mounting section 48 can include a pin slot 49 facing downward, and a similar plurality of mounting holes to receive a pin housing 66.

The plate mount 62 can receive a control element such as the depicted control plate 70, and the pin housing 66 can receive a pin 68. With the housing 66 and mount 62, relative motion can be provided between the pin 68 and the plate 70 as the transmission member 46 moves through the extended hollow shaft 32 of the side housing 30. This relative motion can overlap with surfaces of the control element 70 that define one or more stable holding positions in which the pin 68 can stop. These position can, for example, correspond to positions of the transmission member 46 associated with deployed and/or retracted positions of the wheel assemblies 20. In some embodiments, a controlled relative movement between the pin 68 and the plate 70 is provided by one or more contours defined on the plate 70. In some cases, at least one protrusion is provided to cause a change in the direction of the relative movement of the plate 70 and/or the pin 68.

Figure 6:
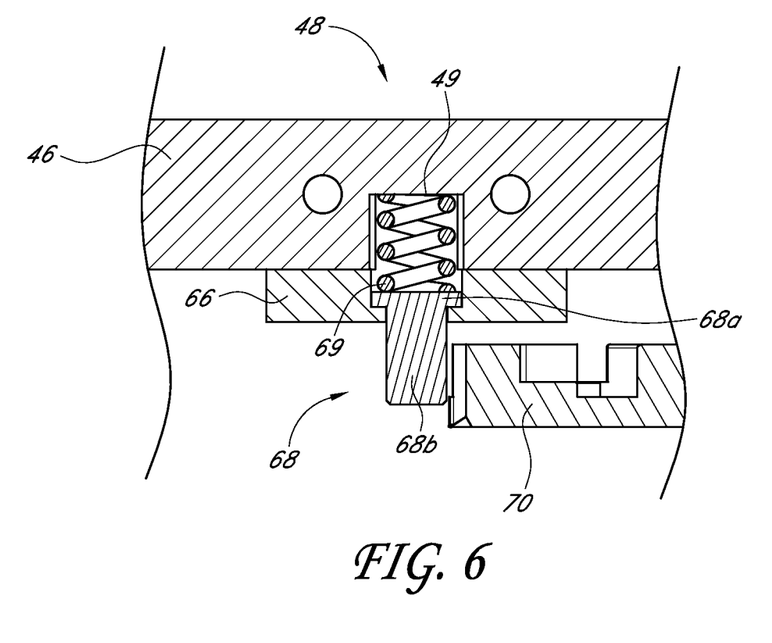
FIG. 6 is a cross-sectional view of the base of FIG. 4A at 6-6.

As best depicted in FIG. 6, the pin 68 can have a circular T-shape, although other shapes are possible. A circular T-shape can include, for example, an elongate cylinder extending away from a shorter and wider cylinder. The pin 68 can reside within a slot 49 in the transmission member 46 shaped to accommodate a wider portion 68a of the pin. Further, the pin 68 can be movably mounted within the pin housing 66, the pin housing 66 mounted around the slot 49. Thus, the pin 68 can be retained in the slot 49 by the pin housing 66, which is depicted as a U-shaped bracket shaped to mount on the transmission member 46 and can include generally semi-circular cut-outs to accommodate the wider portion 68a of the pin (see FIGS. 4A-4F, 6). However, at the base of the pin housing 66 the housing can include a bore sized to only accommodate a narrower portion 68b of the pin 68, as depicted in FIG. 6. Accordingly, the pin housing 66 can retain the pin 68 and hinder the pin's escape from the pin housing 66 and the slot 49 in the transmission member 30. The pin housing 66 can then be securely fixed to the transmission member 46 by pin or screw joints that can pass through the pin housing 66 and optionally also the transmission member.

Thus, the pin housing 66 and slot 49 can define a central bore that allows travel of the wider portion 68a of the pin 68 within the pin housing. This can allow the pin 68 to move up and down within the pin housing 66 and the slot 49, such that the length of the narrow portion of the pin 68 extending beyond the housing can increase and decrease as the pin moves. This movement can bring the pin 68 to extended and retracted positions. Simultaneously, the pin 68 can interact with the control plate 70, as further described below. In some embodiments, the pin 68 can also be biased to an extended position by gravity, by a spring mounted within the housing 66, magnetic forces between the pin and other features, or other mechanisms.

Figure 4A:
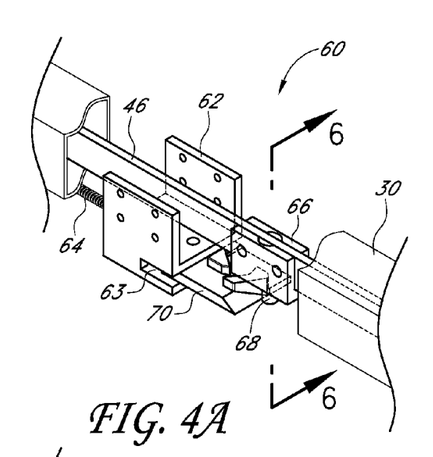
FIG. 4A is a perspective view of the interior of the frame of the base of FIGS. 2A, 2B in a first position.

Similar to the pin housing 66, the plate mount 62 can have a U-shape and be securely fixed to the side housing 30 much like the pin housing 66 mounts to the transmission member 46. Also like the pin housing 66, the plate mount 62 can have a bore through its base that can receive a pin. The depicted plate mount 62 also includes a lower slot 63 on a side of the base of the U-shape features, as best shown in FIGS. 3C, 4A. Within the slot 63, the plate mount 62 can receive a control plate 70 in the lower slot 63, mounted on a pin passing through the bore in the plate mount 62. Thus, the control plate 70 can be rotatably mounted at a pivot 89 to the plate mount 62, and accordingly to the side housing 30.

The control element 70, depicted as a control plate can be substantially planar or semi-planar and have a contoured upper surface adjacent the pin 68 and a spring mounting portion 88 on an opposite side of the control plate's pivot 89 from the contoured surface. A spring 64 can attach to the control plate 70 at the spring mounting portion 88 and extend to a spring mounting portion 37 on the side housing 30. The side housing's spring mounting portion 37 can be generally adjacent the wheel receiving portion 33 nearer the actuating member 58, but other orientations and positions are contemplated. The spring mounting portion 88 of the control plate 70, along with the spring 64, can bias the control plate to rotate to a position generally aligned relative to, e.g., the pin 68. In other embodiments this bias can be achieved by different mechanisms, such as a torsional spring, a bendable plate, a leaf spring, or the like. As will be further discussed below, the control plate 70 can be rotated out of its aligned position by the pin 68, but can then return to this position under the force of the spring 64.

Figure 5:
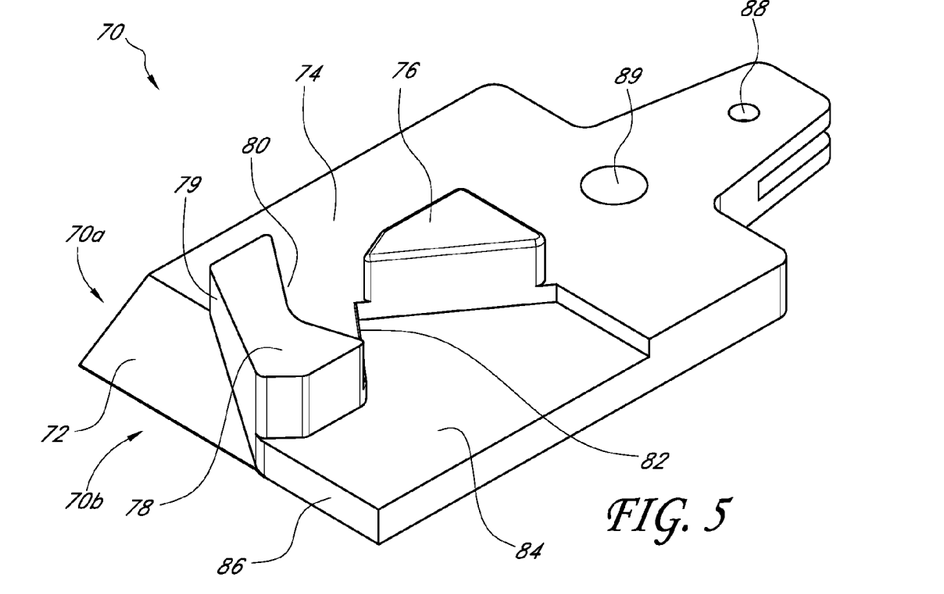
FIG. 5 is a perspective view of the locking plate of FIGS. 4A-4E.
Figure 5A:
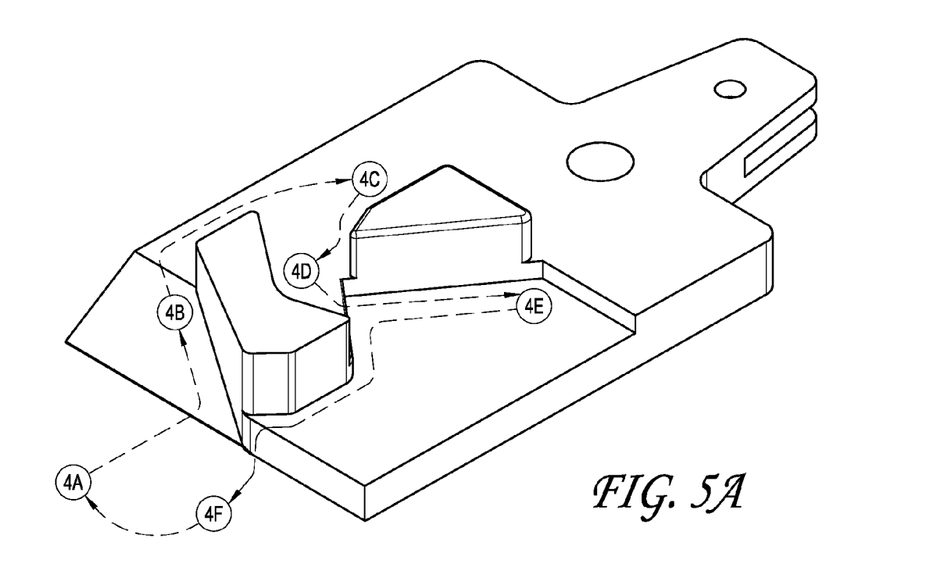
FIG. 5A is a perspective view of the locking plate of FIG. 5 indicating a path between the positions of FIGS. 4A-4F.

The contoured surface 70a is best depicted in FIGS. 5, 5A. On one side of a contoured end 70b of the control plate 70, the control plate can have an angled portion 72. The angled portion 72 can form a gradual increase in height of the upper surface of the control plate 70, or a gradual thickening of the control plate. The angled portion 72 can transition into a first broad portion 74. In the depicted embodiment the transition can be at a corner, but in other embodiments there can be a smooth transition between the angled portion 72 and the first broad portion 74.

As depicted, the first broad portion 74 can be generally flat, although this may vary in other embodiments. Also, the broad portion 74 need not necessarily be wider than the angled portion 72, but rather can have a narrower region near the angled portion 72 and a wider region spaced farther away from the angled portion 72. The first broad portion 74 can include a plurality of guide features, which can be configured as protrusions that extend away from the generally flat area of the first broad portion 74. The guide features are shown in the figures as a guide piece 76 and a hook 78 protruding up from the broad portion. The guide piece 76, as depicted, can be generally triangular and centered along the control plate 70, spaced from the angled portion 72 by the first broad portion 74. The hook 78 can have a generally curved shape and be located between the guide piece 76 and the angled portion 72. The hook 78 can have a concave portion facing into the control plate 70 and toward the pivot 89, to form a holding portion 80. A convex portion of the hook 78 can face toward the contoured end 70b of the control plate. As further depicted, the convex portion of the hook 78 can include a slanted wall 79 along the angled portion 72. The slanted wall 79 can extend transverse to a center of the control plate 70. In some embodiments, a guide feature is provided in place of the hook 78 that has an angled surface on one side and a notch on the opposite side. The angled surface can extend the entire width of the guide feature, e.g., transversely across the plate 70. The angled surface can form one portion of a convex surface. In some embodiments, the notch comprises two surfaces angled toward each other, e.g., a concave surface.

Between the guide piece 76 and the hook 78, the first broad portion 74 can meet a first offset portion depicted as a first ledge 82. The first ledge 82 can be between the guide piece 76 and the hook 78, and separate the first broad portion 74 from a second broad portion 84. In some embodiments the first ledge 82 can extend at an angle relative to the longitudinal axis of the guide plate 70 (see FIG. 5). The ledge 82 can be disposed between the guide piece 76 and the hook 78 to separate the broad portions 74, 84. The second broad portion 84 can also be generally flat, although that can also vary in other embodiments. The second broad portion 84 can extend to a second offset portion depicted as a second ledge 86 at the end of the contoured surface 70a of the control plate 70. Thus, as depicted, the edge 70b of the contoured surface 70a of the control plate 70, opposite from the spring mounting portion 88, can be include two portions: the angled portion 72 and the second ledge 86.

The pin 68 can move along the contoured upper surface 70a of the control plate 70 to control the motion of the wheel assemblies 20 upon actuation of the actuating member 58. This control of the motion along the control plate 70 is best depicted in FIGS. 4A-4F and 5A. As depicted in FIG. 4A, the pin 68 can initially be fully extended away from the pin housing 66 and generally separated from the control plate 70. The pin 68 can be stable in this position, and thus form a first stable position. The transmission member 46 can be configured to have a position corresponding to the first stable position of the pin 68, wherein the transmission member is disposed generally away from the actuating member 58, with the wheel assemblies 20 disposed in a retracted position as discussed above.

Figure 4B:
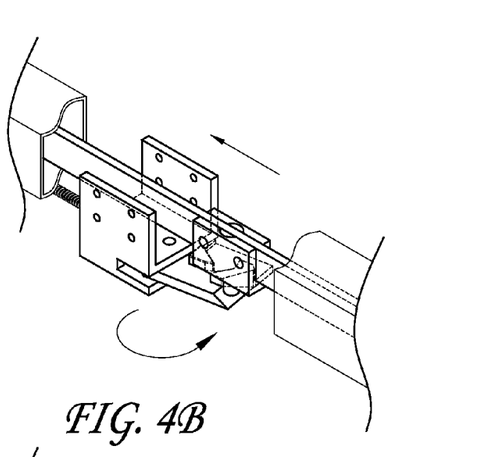
FIG. 4B is a perspective view of the interior of the frame of the base of FIGS. 2A, 2B in a second position.
Figure 4C:
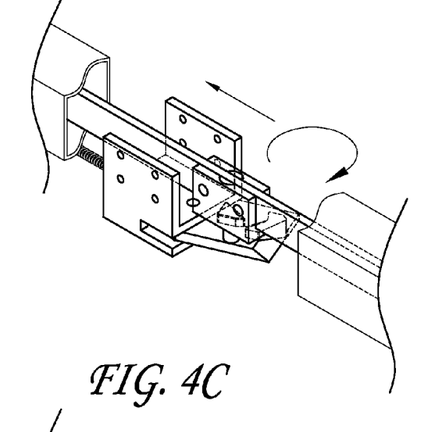
FIG. 4C is a perspective view of the interior of the frame of the base of FIGS. 2A, 2B in a third position.

Then, upon actuation of the actuating member 58, such as a pump of the foot pedal, the transmission member 46 can translate toward the actuating member 58. This translation can bring the wheel assemblies 20 into a deployed position, as discussed above. Additionally, the motion can move the pin 68 toward the control plate 70, as best depicted in FIGS. 4B, 4C. The pin 68 can contact the slanted wall 79, which can guide the pin 68 along the angled portion 72 of the plate 70. In one embodiment the slanted wall 79 extends generally transversely across a central portion of the control plate 70, and the control plate 70 is biased toward a centered position. In this embodiment, initial contact between the pin 68 and the plate at the slanted wall is encouraged. In other embodiments, the slanted wall 79 can extend transversely on the plate 70 between two ends both of which are offset laterally of a longitudinal axis of the plate 70. For example, the slanted wall 79 can be configured such that a projection of the ends of the wall onto a plane perpendicular to the longitudinal axis of the plate 70 is less than half the width of the plate 70. These arrangements enable relative sliding movement of the pin 68 relative to the plate 70 without causing the pin 68 to travel beyond the lateral edge of the plate. The movement to the angled portion 72 can be further encouraged by the second ledge 86, which can generally hinder movement of the pin 68 onto the second broad portion 84.

As the pin 68 moves up the angled portion 72, the pin can generally move into a retracted position within the pin housing 66. Further, the pin 68 can push against the slanted wall 79, causing the control plate 70 to rotate, accommodating the pin's motion toward the control plate, as best depicted in FIG. 4B. For matters of convenience, at some portions herein the pin may be described as moving in a lateral or transverse direction along the control plate, which includes movement that is perpendicular to the primary axis of the transmission member 46. However, in the depicted embodiment it will be understood that this is a relative movement, partially caused by the rotation of the control plate 70 relative to the side housing 30, the pin 68, and the remainder of the umbrella system 1. Nevertheless, in other embodiments the pin 68 can be configured to move in such lateral or transverse directions, such as within a lateral or transverse slot in the pin housing 66 as a contoured surface 70a remains in a static position. Similarly, in some embodiments the pin 68 can remain in a static lateral and transverse position as the contoured surface 70a travels relative to the pin.

Figure 4D:
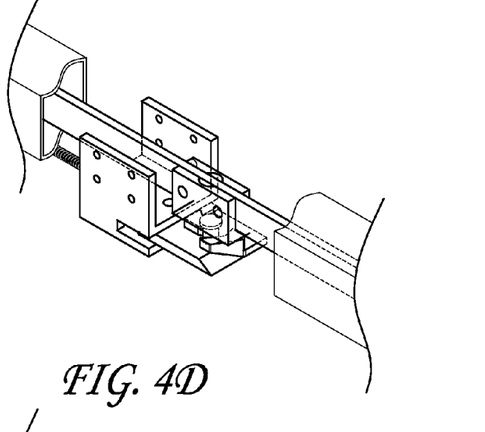
FIG. 4D is a perspective view of the interior of the frame of the base of FIGS. 2A, 2B in a fourth position.

After the pin 68 has moved up the angled portion 72, it can be held in its retracted position within the pin housing 66 by the first broad portion 74. The pin 68 can eventually move along the first broad portion 74, past the slanted wall 79 of the hook 78. Subsequently, the control plate 70 can pivot back toward a centered position, as the pin 68 no longer contacts the hook 78 to push the plate, as best depicted in FIG. 4C. However, the pin 68 thereafter can contact the guide piece 76. In the depicted embodiment, the guide piece 76 contacting the pin 68 can hold the control plate 70 slightly off-center, e.g. rotated inwardly toward a central area of the frame 18. At this point, the actuating member 58 can be released, allowing the transmission member 46 to translate back and away from the actuating member. This can similarly cause the pin 68 to move back, away from the control plate 70, and toward the angled portion 72. However, the pin 68 can be guided by the guide piece 76 into the concave holding portion 80 of the hook 78, as best depicted in FIG. 4D.

The hook 78 can define a holding portion 80, where the pin 68 can be generally held to hinder further relative translation between the pin 68 and the control plate 70. Similarly, this can generally hinder further movement of the transmission member 46 and the wheel assemblies 20 relative to the rest of the umbrella system 1. Thus, in some embodiments, the wheel assemblies can then be locked in a deployed position. As discussed above, in this position the force of the load on the base assembly 10 is directed to urge the wheel assemblies 20 toward a retracted position, and correspondingly to urge the pin 68 away from the control plate 70. However, this force and urged motion can be substantially opposed and prevented by the hook 78.

Figure 4E:
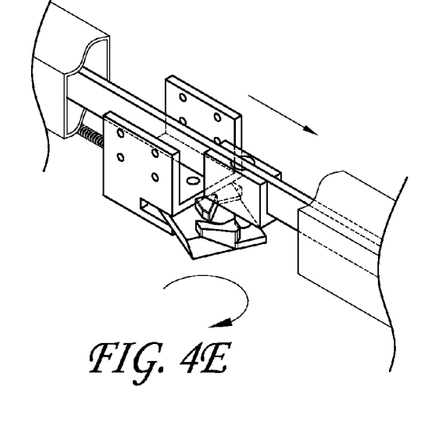
FIG. 4E is a perspective view of the interior of the frame of the base of FIGS. 2A, 2B in a fifth position.

The pin 68 can be brought out of engagement with the hook 78 and the holding portion 80 upon a second actuation of the actuating member 58, as best depicted in FIG. 4E. Upon this second actuation, the pin 68 can be moved toward the pivot 89. The pin 68 can then encounter another surface of the guide piece 76, which can bias the pin toward the second broad portion 84 and the first offset portion 82 (or alternatively, rotate the control plate 70 as such). The pin 68 can then pass over the first offset portion 82, allowing the pin 68 to extend further out of the pin housing 66.

Then, when the actuating member 58 is released the pin 62 can move off the second broad portion 84 (and the control plate 70) and over the second offset portion 86, as best depicted in FIG. 4E. This path can be guided by the first offset portion 82. The first offset portion 82 can be substantially steep such that the pin 68 can not easily move back onto the first broad portion 74, which is higher than the second broad portion 84. Additionally, the first offset portion 82 can be angled, guiding the pin 68 toward the second offset portion 86. This angled portion of the first offset portion 82 can cause a rotation of the control plate 70 that is similar to that caused by interactions between the pin 68 and the slanted wall 79 discussed above. In some embodiments this rotation can be in the opposite direction, for example to accommodate the pin 68 on the opposite side of the control plate 70.

Figure 4F:
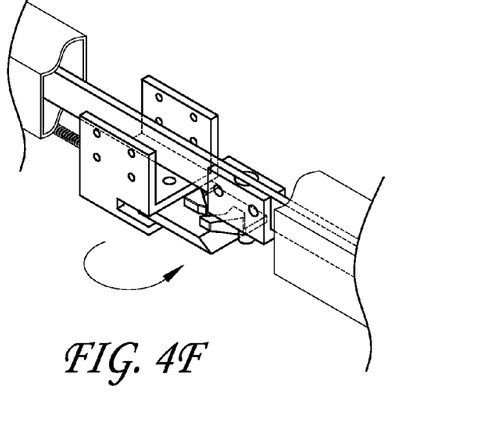
FIG. 4F is a perspective view of the interior of the frame of the base of FIGS. 2A, 2B in a sixth position.

The pin 68 can then pass over the second offset portion 86 and return to its original extended position as depicted in FIG. 4F. Similarly, the control plate 70, via the force of the spring 64, can return to its original rotational position. The second offset portion 86 can be substantially steep, such that the pin 68 cannot easily move back onto the second broad portion 84. Thus, with two actuations of the actuating member 58, the pin 68 can make a closed loop along the surface of the control plate 70, bringing the pin 68 back to the position depicted in FIG. 4A. In one embodiment the motion of the pin 68 is configured such that the pin can also be guided through a non-intersecting loop.

In the motion of the pin 68 a plurality (e.g., two) stable positions can be defined. First, depicted in FIG. 4A, the pin 68 can be fully extended and generally off the control plate 70. Then, upon a first actuation or pump of the actuating member 58, the pin 68 can move into the holding portion 80, as depicted in FIG. 4D. Then, upon a second actuation or pump of the actuating member 58, the pin 68 can return to the position of FIG. 4A. Between the two positions the pin 68 traverses a guided path on the control plate 70 as the wheel assemblies 20 move between retracted and deployed positions. In one embodiment the deployed position corresponds with the holding portion 80 and the retracted position corresponds with the pin positioned away from the control plate 70.

Other embodiments are possible. For example, in some embodiments the retracted and deployed positions can be associated with other relative positions between the pin 68 and the control plate 70, such as the retracted position being associated with the holding portion 80 and the deployed position being associated with the pin 68 away from the control plate 70. Additionally, in some embodiments the control plate 70 and the pin 68 can be arranged and formed to provide more than two stable positions, such as where the control plate 70 defines more than one holding portion 80. Providing ever more stable positions can allow a greater variety of positions for the wheel assemblies 20, or other elements. For example, in some embodiments the pin 68 and the control plate 70 can define a mid-deployed position where some but not all of the wheel assemblies 20 fully extend beyond the cover 14. Further, in some embodiments all of the stable positions can be defined with the pin 68 contacting the control plate 70.

Various associations between the positions of the pin 68 and the control plate 70 with the wheel assemblies 20 (or other elements) can be further supported by other features. For example, in some embodiments a biasing member can be added that biases the control assembly 60 toward a particular position. In one embodiment, a spring can be mounted between the transmission member 46 and the side housing 30, pulling the transmission member toward a position associated with the wheel assemblies 20 being deployed.

Further, in some embodiments the control assembly 60 can be used in other contexts. For example, in some embodiments the control assembly 60 can control a reversible jack, a braking system, a locking mechanism or the like. In such embodiments, the control assembly 60, including elements such as the control plate 70 and the pin 68, can be separated from the side housing 30 and other elements of the umbrella assembly 1. The control assembly 60 can then be integrated into an alternative assembly with which it will be used.

The umbrella system 1 can be formed from a variety of materials. For example, in some embodiments a majority of the base assembly 10 can be metal, such as the side housing 30. However, the wheels 22 and pins 20 can be formed from other materials, such as a hardened plastic. The use of other materials is also contemplated as part of any of the embodiments described above.

Although the foregoing description of the preferred embodiment of the present invention has shown, described, and pointed out the fundamental and novel features of the invention, it will be understood that various omissions, substitutions, and changes in the form of the detail of the apparatus as illustrated, as well as the uses thereof, may be made by those skilled in the art without departing from the spirit of the present invention.

What is claimed is:

1. A control mechanism comprising:
an actuating member movably coupled to a housing;
a transmission rod coupled to the actuating member such that actuation of the actuating member causes the transmission rod to translate relative to the housing;
a pin mounted to the transmission rod;
a control plate rotatably mounted to the housing, the control plate comprising a contoured surface substantially defining a pin path wherein the pin can move from a first stable position and enter into a second stable position along the path upon a first actuation of the actuating member, and the pin can exit the second stable position and return to the first stable position along the path upon a second actuation of the actuating member; and
wherein motion of the transmission rod causes the pin to move between the first and second plate positions.

2. The control mechanism of claim 1, wherein the path along which the pin moves from the first stable position to the second stable position is different from the path along which the pin moves from the second stable position to the first stable position.

3. The control mechanism of claim 2, wherein the pin is hindered from moving in a reverse direction along the path.

4. The control mechanism of claim 3, wherein the path comprises one or more offset portions.

5. The control mechanism of claim 1, wherein pin is held within the housing mounted to the transmission rod, and the pin can move relative to the transmission rod and the housing between extended and unextended positions.

6. The control mechanism of claim 5, wherein the pin is in an extended position at the first stable position, and in an unextended position at the second stable position.

7. The control mechanism of claim 5, wherein the pin is biased toward an extended position.

8. The control mechanism of claim 1, wherein the first stable position is substantially off of or away from the plate and the second stable position is in a holding portion of the plate.

9. The control mechanism of claim 1, wherein the pin is generally biased toward the first stable position.

10. The control mechanism of claim 1, wherein the control plate is rotatably mounted to the housing.

11. The control mechanism of claim 10, wherein the control plate is rotationally biased toward a centered position.

12. A control mechanism comprising:
an actuating lever movably coupled to a housing;
a transmission member operatively coupled to the actuating lever such that a pumping of the actuating lever causes the transmission member to move relative to the housing;
a pin mounted to one of the transmission member and the housing to move in at least one direction relative to the transmission member or housing; and
a control element mounted to the other of the transmission member and housing to move in at least one direction relative to the transmission member or housing, wherein the control element comprises a surface defining at least one stable holding position for the pin such that the pin can be received in the stable holding position upon a first pump of the actuating lever and can be separated from the stable holding position upon a second pump of the actuating lever.

13. The control mechanism of claim 12, wherein the surface of the control element generally hinders the pin from moving directly back-and-forth as it moves into and out of the holding position.

14. The control mechanism of claim 13, wherein the surface of the control plate generally directs the pin into a looped path in and out of the holding position.

15. A control mechanism comprising:
a pin disposed on a housing; and
a control element disposed on the housing such that the control element can at least move relative to the pin, wherein the control element defines a surface comprising:
an angled portion;
a holding portion; and
an offset portion,
wherein, a first motion of the control element relative to the pin causes the pin to traverse the angled portion, a second motion of the control element relative to the pin generally opposite the first motion causes the holding portion to receive the pin, a third motion of the control element relative to the pin generally in the same direction as the first motion causes the pin to be separated from the holding portion and to traverse the offset portion, and a fourth motion of the control element relative to the pin generally in the same direction as the second motion causes the pin to be separated from the offset portion.

16. The control mechanism of claim 15, wherein the control element is rotatably coupled to the housing.

17. The control mechanism of claim 16, wherein the control element is biased toward a centered position.

18. The control mechanism of claim 16, wherein a rotation of the control element partially defines the motion of the plate relative to the pin.

19. The control mechanism of claim 16, wherein the motion of the control element relative to the pin causes the pin to exert a force on the control element causing a rotation of the control plate.

20. The control mechanism of claim 15, wherein the offset portions generally allow relative movement of the pin in a first direction across the offset portion and hinder relative movement of the pin in an opposite direction across the offset portion.

21. The control mechanism of claim 15, wherein the fourth motion can bring the pin to a position generally adjacent the angled portion.

22. The control mechanism of claim 15, wherein the holding portion comprises a hook.

* * * * *